(12) United States Patent
Rothman et al.

(10) Patent No.: US 7,583,591 B2
(45) Date of Patent: Sep. 1, 2009

(54) FACILITATING COMMUNICATIONS WITH CLUSTERED SERVERS

(75) Inventors: Michael A. Rothman, Gig Harbor, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 1290 days.

(21) Appl. No.: 10/314,619

(22) Filed: Dec. 8, 2002

(65) Prior Publication Data
US 2004/0109406 A1 Jun. 10, 2004

(51) Int. Cl.
*G01R 31/08* (2006.01)
(52) U.S. Cl. .................... 370/218; 370/242; 709/226
(58) Field of Classification Search ............. 370/406, 370/216, 221, 217; 714/4
See application file for complete search history.

(56) References Cited

U.S. PATENT DOCUMENTS

| | | | | |
|---|---|---|---|---|
| 5,452,448 A | * | 9/1995 | Sakuraba et al. | 707/201 |
| 5,696,895 A | * | 12/1997 | Hemphill et al. | 714/4 |
| 5,796,934 A | * | 8/1998 | Bhanot et al. | 714/4 |
| 5,812,751 A | * | 9/1998 | Ekrot et al. | 714/4 |
| 6,145,089 A | * | 11/2000 | Le et al. | 714/4 |
| 6,449,734 B1 | * | 9/2002 | Shrivastava et al. | 714/15 |
| 6,611,526 B1 | * | 8/2003 | Chinnaswamy et al. | 370/406 |
| 6,865,157 B1 | * | 3/2005 | Scott et al. | 370/242 |
| 6,973,587 B1 | * | 12/2005 | Maity et al. | 714/6 |
| 6,988,193 B2 | * | 1/2006 | French et al. | 713/2 |
| 7,039,827 B2 | * | 5/2006 | Meyer et al. | 714/4 |
| 7,069,317 B1 | * | 6/2006 | Colrain et al. | 709/224 |
| 7,138,733 B2 | * | 11/2006 | Sanders et al. | 307/147 |
| 7,339,786 B2 | * | 3/2008 | Bottom et al. | 361/679.41 |
| 7,415,519 B2 | * | 8/2008 | Abbondanzio et al. | 709/226 |
| 7,457,127 B2 | * | 11/2008 | Rietze et al. | 361/728 |
| 2004/0111559 A1 | * | 6/2004 | Heil | 711/114 |

* cited by examiner

*Primary Examiner*—Michael J Moore, Jr.
(74) *Attorney, Agent, or Firm*—Trop, Pruner & Hu, P.C.

(57) ABSTRACT

A plurality of servers arranged in a cluster, such as a plurality of blade servers, may communicate with a network over a first communication path. The servers may also communicate with each other over another communication path such as an out-of-band channel. Using the out-of-band channel, a server that is having a communication or a software failure may communication with other blade servers using the out-of-band channel. The other blade servers may act as a proxy for the server with a problem, enabling the proxy to communicate on behalf of the server having a communication problem. As a result, useful computational work may be obtained in many cases from servers that would otherwise be taken off-line.

21 Claims, 3 Drawing Sheets

FACILITATING COMMUNICATIONS WITH CLUSTERED SERVERS

BACKGROUND

This invention relates generally to servers and, particularly, to clusters or groups of servers that operate together.

Commonly, groups of servers are provided to execute complex tasks. Commonly server farms include large numbers of servers. These servers work together in either a peer-to-peer arrangement or in a variety of other hierarchies.

One type of clustered server is called a blade server. A blade server may be a thin module or electronic circuit board, usually for a single, dedicated application, such as serving web pages. A blade server is designed to be mounted in a blade server rack with a large number of other blade servers.

When any one of a large number of blade servers in a rack suffers failure in any of its components or its local disk, the failed blade server is simply considered a lost cause. A blade server may be taken off-line if it requires a boot from a failed local disk or network program load from a defective network interface card for its operating system loader. At this point, the failed blade server becomes inoperative hardware necessitating human interaction with the system in order to replace the component.

Moreover, the inability of one server to function may adversely impact the overall operation of the entire cluster of servers. Thus, the failure of even one server may have a relatively significant, if not catastrophic, impact on the overall operation of the cluster of servers.

Thus, there is a need for better ways to enable clusters of servers to handle defects that occur in one or more of the servers in the cluster.

DETAILED DESCRIPTION

Figure 1:
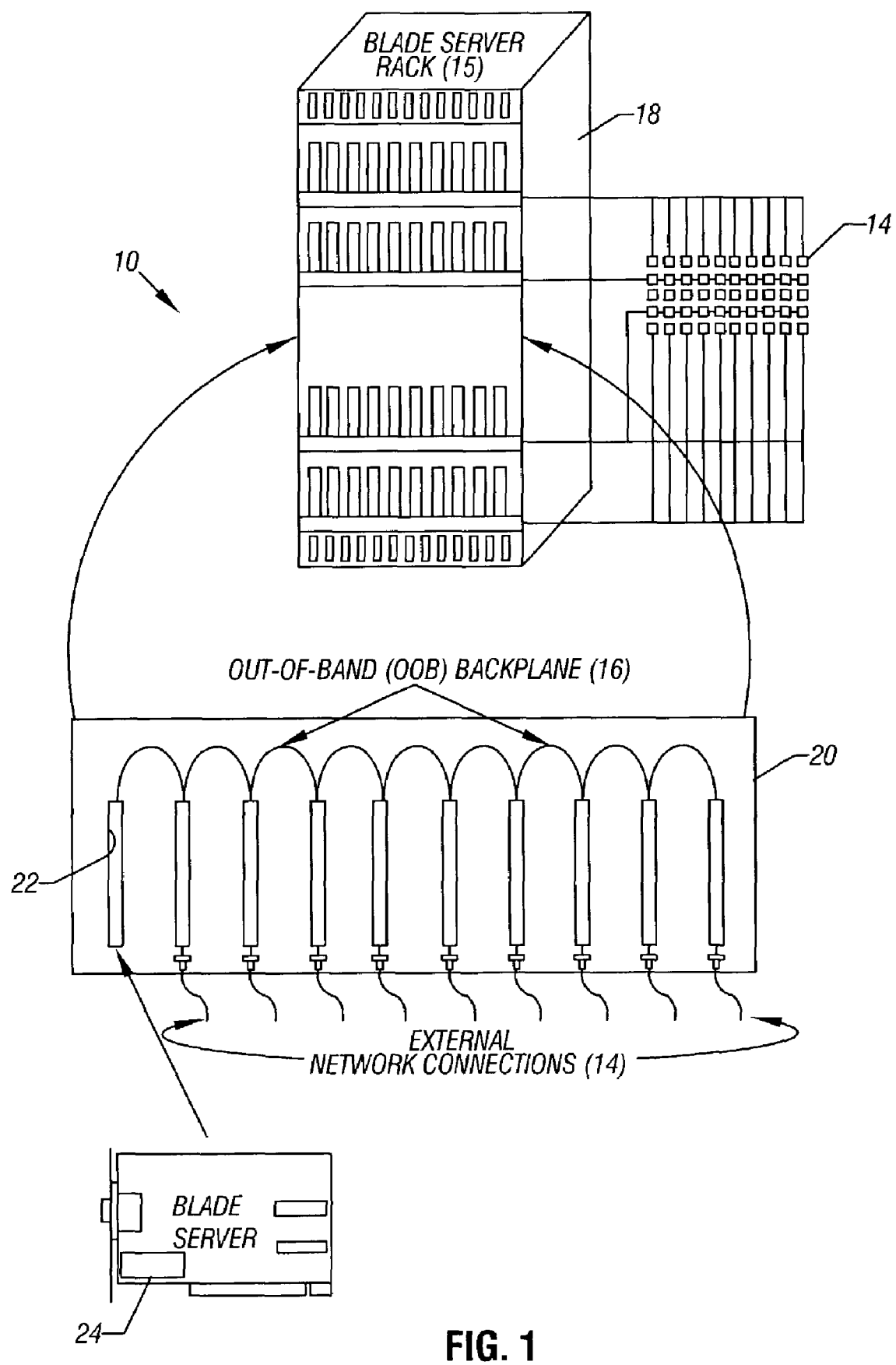
FIG. 1 is a schematic depiction of one embodiment of the present invention.

Referring to FIG. 1, an array or cluster of servers may communicate through network connections 14. In one embodiment, the array or cluster of servers may be a cluster of blade servers mounted in a rack 15 including a housing 18. However, the present invention is not limited to any particular type of server.

Each level 20 in the rack 15 may include a plurality of openings 22 to receive blade servers 24, for example in a slide fit connection.

Each of the servers 24 in a layer 20 may communicate through an out-of-band (OOB) back plane 16. The back plane 16 may enable back plane communication between the blade servers 24 in a given rack 15. At the same time, each server 24 connects through external connections 14 to an external network. The external network may include the Internet, a local area network, or any other network.

Thus, in some embodiments, the rack 15 of blade servers 24 may be coupled to the Internet to act as a web server. In other embodiments, the blade server rack 15 may be part of a large data center.

Figure 2:
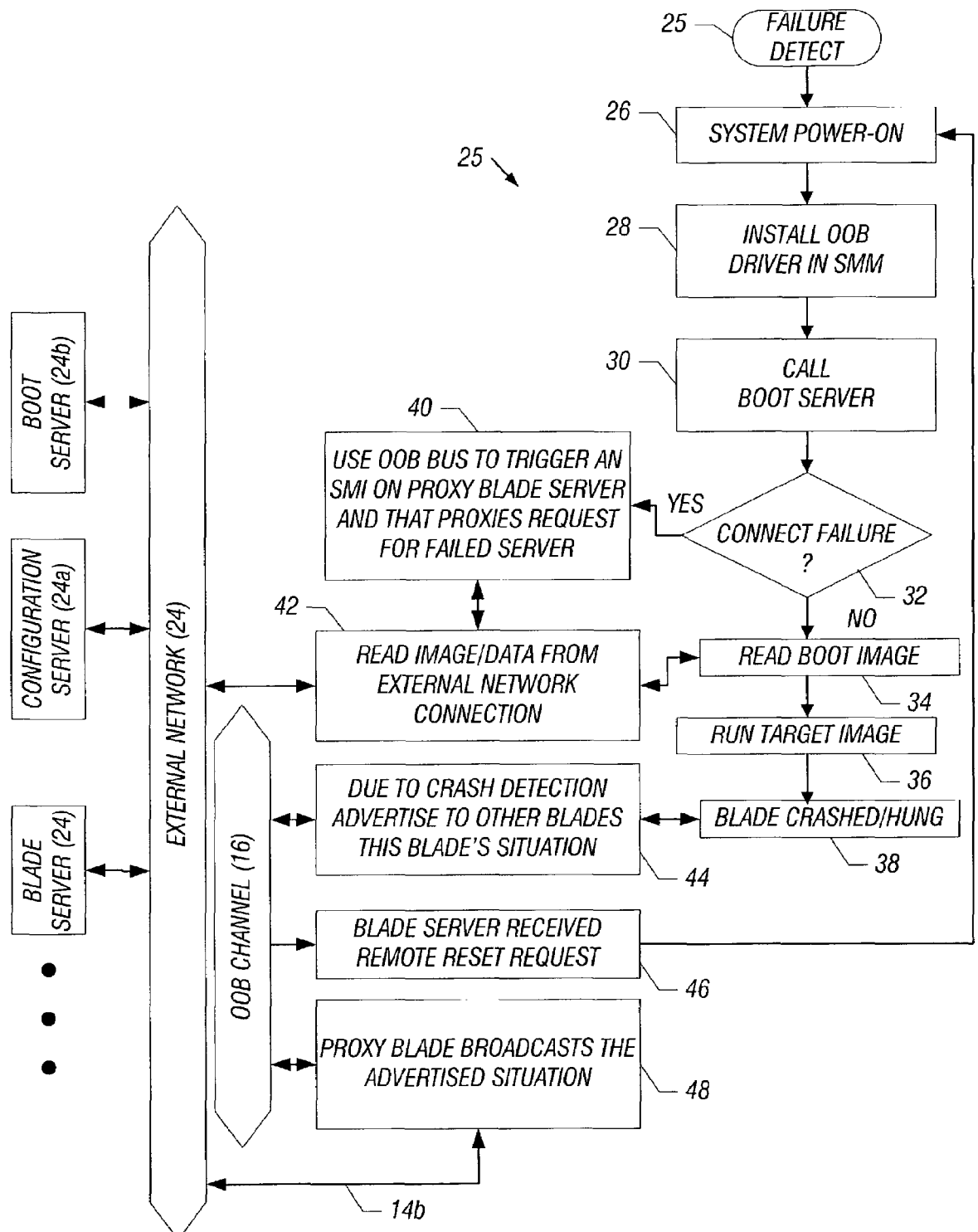
FIG. 2 is a flow chart for software in accordance with one embodiment of the present invention.

Referring to FIG. 2, the various external network connections 14 may couple to an external network 24. The external network 24 may couple, in turn, to a remote configuration server 24a and a remote boot server 24b in one embodiment. The boot server 24b may be responsible for providing configuration information or target operating system information to facilitate booting in one embodiment. The configuration server 24a may be an external agent that may be remote from the rack 15 and that communicates with each of the blade servers 24 in the rack over the external network 24, monitoring the status of the blade servers 24 in one embodiment.

Any number of blade servers 24 may then be coupled to the external network over the network connections 14. Failure detect software 25 may be responsible for handling any failure of any given blade server 24 within the rack or cluster of blade servers 24. While the following example involves a blade server, those skilled in the art will appreciate that the principles of the present invention may apply to any cluster of servers.

Initially, the failure detect software 25 determines that a system power-on event has occurred as indicated in block 26. An out-of-band driver may then be installed, for example in the system management mode (SMM) memory space, as indicated in block 28 in one embodiment. The out-of-band driver enables inter-server 24 communication through the out-of-band back plane 16. The driver may also be responsible, in some embodiments, for monitoring the out-of-band back plane 16 for various agents that may be trying to communicate information.

Once the driver has been installed, the boot server 24b may be called, as indicated in block 30, in order to boot a particular blade server 24 running the software 25. A check at diamond 32 determines whether a connection failure has been detected. A connection failure may be any inability to connect over the network by any blade server 24 within the cluster. For example, a blade server 24 may not be able to connect to the network boot server 24b over the network connections 14. If no connection failure has been detected, the boot image is read, as indicated in block 34, and a target image is run as indicated in block 36.

If a connection failure is detected, the OOB back plane 16 is used to trigger a system management interrupt (SMI) or other notification on another blade server 24. Thus, one blade server 24, called a failed blade server, may have a connection failure and another blade server 24, called a proxy blade server, may be triggered by the failed blade server over the OOB back plane 16 as indicated in block 40. The proxy blade server proxies the boot request for the failed blade server in the case where the connection failure is a failure to communicate with the boot server 24b. In other cases, the proxy blade server proxies a communication for the failed boot server.

In the face of an incoming communication failure, the requested image or data is read from the external network connection 14 by the proxy blade server 24. This information may then be provided over the OOB back plane 16 to the failed blade server 24. Thereafter, the boot image may be read and the flow may continue.

If a blade server 24 crashes or hangs for example, or it experiences any other failure, as indicated in block 38, the failed blade server advertises its situation to other blade servers using the OOB back plane 16. Other blade servers 24 may receive a remote reset request, indicated in block 46, as a proxy for the failed blade server. That reset request may be communicated over the OOB back plane 16 to the failed blade server which may then be reset as indicated at block 46.

The proxy blade server that receives information over the OOB back plane 16 may broadcast the situation of the failed blade server over the back plane 16. The proxy blade server may also receive a response over the back plane 16 or connections 14 to the broadcast, for example, on behalf of the failed blade server as indicated in block 48. Thus, a proxy blade server may handle either incoming or outgoing communications on behalf of a failed server.

Figure 3:
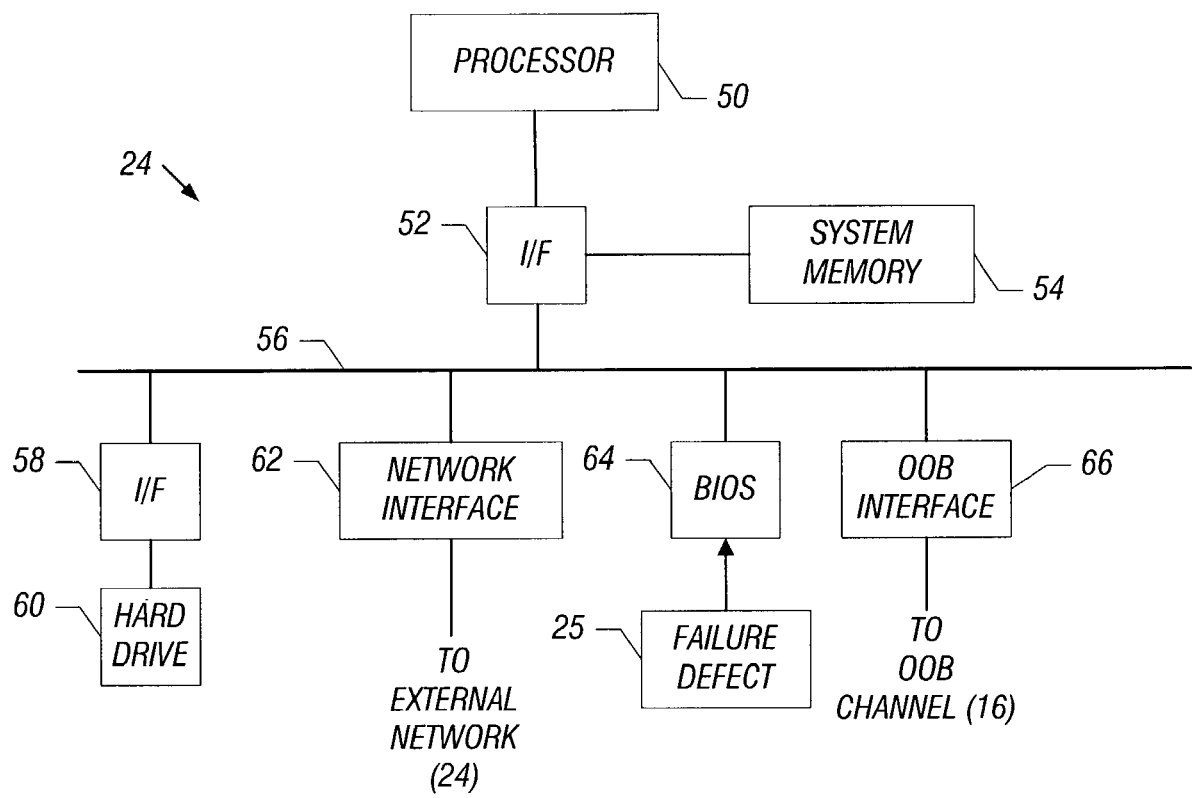
FIG. 3 is a schematic depiction of a blade server in accordance with one embodiment of the present invention.

Referring to FIG. 3, in one embodiment of an architecture, each blade server 24 may include a processor 50 coupled to an interface 52. The interface 52 may couple a bus 56 and system memory 54. The bus 56 may be coupled to an interface 58 to a hard disk drive 60. The bus 56 may also be coupled through an interface 62 to the external network 24. The bus 56 may also couple to a memory 64 that stores the basic input/output system (BIOS). The basic input/output system may include the failure detect software 25 in one embodiment of the present invention. The bus 56 is also coupled to the OOB interface 66 that, in turn, couples to the OOB back plane 16 in one embodiment of the present invention.

Thus, the OOB driver may be utilized to communicate through the OOB back plane 16. The driver is responsible for communications onto the OOB back plane 16 and from the OOB back plane 16.

By enabling another blade server 24 to proxy communications on behalf of the failed blade server 24, the operability of the overall system may be preserved despite the failure of any one given blade server 24. For example, a proxied restart may allow a blade server 24 to boot into an operational environment and perform useful work during the period between its device failure and an upgrade. The blade server 24 may still accept compute jobs while waiting for a service call to update its failed disk or connection. This may allow for service calls to be deferred and the owner of the blade server to continue to get useful results from the computational element.

In addition, the ability to have a shared state across the OOB, such as a system management interrupt, a reset, or other signaling to pure blade servers, may allow the individual mean time between failure to be extended in some cases. Specifically, any single blade server failure hang can have a peer unhang it via a remotely activated signal. In the case of a system management interrupt-based signaling, one blade server can act as a watchdog timer for its peer blade servers, with the watchdog state machine being managed transparently to the operating system at run time.

Finally, the peer blade-to-peer blade topology allows for any blade server to act as a manageability proxy server for its neighboring blade server, in some embodiments. So in the case of a hung blade server that cannot access its local input/output resources, such as a disk (for log-file) or a network, system management mode-based recovery firmware in the failed blade server can communicate via the OOB channel to a peer blade server, in some embodiments. In this case, a peer blade server can proxy the failed unit's crisis messages to a provisioning or other management servers.

While the principles of the present invention may be applicable to blade servers that are in a peer-to-peer arrangement, it is also applicable to blade servers in chassis manager/many blades topology or chassis management modules. It may also be applicable to share nothing blade topologies where the rack is "dumb" with respect to the blade servers and the rack simply provides common power and some integrated network switch. In such case, the OOB may be added, for example as a secondary network interface card on each blade server within an associated switch or hub for the blade servers.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
enabling communications over a first path by each of a plurality of blade servers in a rack of blade servers including a first and a second blade server;
enabling communications between the servers over an out-of-band channel;
enabling the first blade server to communicate with a boot server, not in said rack, to facilitate booting of said second blade server in said rack, said second blade server unable to communicate with said boot server, said first blade server triggered to communicate with said boot server in response to a failure of the second blade server to communicate; and
enabling said boot server to reboot said second blade server in response to a request from said first blade server.

2. The method of claim 1 wherein enabling communications includes enabling communications with an external network over a first path by each of a plurality of servers and enabling communications between the servers over an out-of-band channel.

3. The method of claim 1 including enabling a first server of said plurality of servers to handle a communication for a second server of said plurality of servers.

4. The method of claim 3 including enabling the first server of said plurality of servers to handle a communication for the second server of the plurality of servers when the second of the plurality of servers has a communication failure.

5. The method of claim 4 wherein the first and second servers communicate over the out-of-band channel while the first server communicates over both the out-of-band channel and the first path.

6. The method of claim 5 including enabling the first server to broadcast information about the second server's failure to other servers.

7. The method of claim 5 including enabling the first server to receive a communication for the second server.

8. The method of claim 5 including enabling the first server to send a communication over an external network for the second server.

9. The method of claim 1 including detecting a failure of one of said plurality of servers and enabling another of said plurality of servers to communicate on behalf of said failed server.

10. An article comprising a medium storing instructions that, if executed, enable a processor-based system to:
enable communications over a first path by each of a plurality of blade servers in a rack of blade servers including a first and a second blade server;
enable communications between the servers over an out-of-band channel;
enable the first blade server to communicate with a boot server not in said rack to facilitate booting of said second blade server in said rack, said second blade server unable to communicate with said boot server, said first blade server triggered to communicate with said boot server in response to a failure of the second blade server to communicate; and
enabling said boot server to reboot said second blade server in response to a request from said first blade server.

11. The article of claim 10 further storing instructions that, if executed, enable the processor-based system to enable communications with an external network over a first path by each of a plurality of servers and enable communications between the servers over an out-of-band channel.

12. The article of claim 10 further storing instructions that, if executed, enable the processor-based system to enable a first server of said plurality of servers to handle a communication for a second server of said plurality of servers.

13. The article of claim 12 further storing instructions that, if executed, enable the processor-based system to enable the first server of said plurality of servers to handle a communication for the second server of the plurality of servers when the second of the plurality of servers has a communication failure.

14. The article of claim 13 further storing instructions that, if executed, enable the processor-based system to communicate over the out-of-band channel while the first server communicates over both the out-of-band channel and the first path.

15. The article of claim 14 further storing instructions that, if executed, enable the processor-based system to enable the first server to broadcast information about the second server's failure to other servers.

16. The article of claim 14 further storing instructions that, if executed, enable the processor-based system to enable the first server to receive a communication for the second server.

17. The article of claim 14 further storing instructions that, if executed, enable the processor-based system to enable the first server to send a communication over an external network for the second server.

18. The article of claim 10 further storing instructions that, if executed, enable the processor-based system to detect a failure of one of said plurality of servers and enable another of said plurality of servers to communicate on behalf of said failed server.

19. A server cluster comprising:
a rack including at least a first and a second blade server;
an out-of-band back plane coupled to each of said servers;
said servers each having a connection to an external network separate from said out-of-band back plane; and
a storage coupled to said blade servers storing instructions that, if executed, enable said blade servers to communicate over said back plane when said connection to said external network is disabled, said storage further storing instructions to enable the first blade server to communicate with a boot server, not in said rack, to facilitate booting of said second blade server in said rack, said second blade server unable to communicate with said boot server, said first blade server triggered to communication with said boot server in response to a failure of the second blade server to communicate and enabling said boot server to reboot said second blade server in response to a request from said first blade server.

20. The server cluster of claim 19 wherein when one of said servers is unable to communicate over said external network, the other of said servers communicates on behalf of said server that is unable to communicate.

21. The server cluster of claim 19 wherein said storage stores instructions that, if executed, enable one of said servers to obtain information over the external network for the other of said servers and provide said information to the other of said servers through said out-of-band back plane.

* * * * *